(12) United States Patent
Davari et al.

(10) Patent No.: US 7,974,826 B2
(45) Date of Patent: Jul. 5, 2011

(54) ENERGY SYSTEM MODELING APPARATUS AND METHODS

(75) Inventors: Bijan Davari, Fremont, CA (US); Scott Terrell Williams, Minden, NV (US); Peter Anton Pechtl, Graz (AT); Larry Keith McDonald, Carson City, NV (US); Alfred Ong'iro, Carson City, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/234,438

(22) Filed: Sep. 23, 2005

(65) Prior Publication Data
US 2007/0168174 A1      Jul. 19, 2007

(51) Int. Cl.
*G06G 7/54*       (2006.01)
*G06F 11/30*     (2006.01)

(52) U.S. Cl. ................. 703/18; 702/182; 700/103
(58) Field of Classification Search .......... 703/18; 702/182; 700/103
See application file for complete search history.

(56) References Cited

U.S. PATENT DOCUMENTS

| | | | | |
|---|---|---|---|---|
| 4,613,952 A | * | 9/1986 | McClanahan | 703/6 |
| 5,159,562 A | * | 10/1992 | Putman et al. | 700/288 |
| 5,315,521 A | * | 5/1994 | Hanson et al. | 700/103 |
| 5,347,466 A | * | 9/1994 | Nichols et al. | 703/18 |
| 5,586,066 A | * | 12/1996 | White et al. | 702/181 |
| 5,621,654 A | * | 4/1997 | Cohen et al. | 700/287 |
| 5,666,297 A | * | 9/1997 | Britt et al. | 703/18 |
| 5,812,394 A | * | 9/1998 | Lewis et al. | 700/17 |
| 5,886,895 A | | 3/1999 | Kita et al. | |
| 5,900,555 A | | 5/1999 | Westphal et al. | |
| 6,041,263 A | | 3/2000 | Boston et al. | |
| 6,230,495 B1 | | 5/2001 | Benesch et al. | |
| 6,442,515 B1 | * | 8/2002 | Varma et al. | 703/22 |
| 6,591,225 B1 | * | 7/2003 | Adelman et al. | 702/182 |
| 6,766,224 B2 | | 7/2004 | Tanaka | |
| 6,804,612 B2 | | 10/2004 | Chow et al. | |
| 7,016,742 B2 | | 3/2006 | Jarrell et al. | |
| 7,039,575 B2 | | 5/2006 | Juneau | |
| 7,050,943 B2 | | 5/2006 | Kauffman et al. | |
| 7,237,109 B2 | * | 6/2007 | Scott et al. | 713/164 |

OTHER PUBLICATIONS

Claus Kahlert, Leon O. Chua, "The Structure of Continuous Piecewise-Linear Functions" IEEE, 1990, 4 pages.*

* cited by examiner

*Primary Examiner* — Dwin M Craig
(74) *Attorney, Agent, or Firm* — Armstrong Teasdale LLP

(57) ABSTRACT

A computer-implemented method for modeling and/or improving operational performance of an energy system includes providing a graphical user interface configured to allow a user to manipulate equipment icons into an energy system model representation, using modular, piece-wise linear equipment models to simulate non-linear behavior of equipment represented by the manipulated equipment icons to solve an energy system model represented by the manipulation, and displaying a solution of the energy system model.

15 Claims, 6 Drawing Sheets

ENERGY SYSTEM MODELING APPARATUS AND METHODS

BACKGROUND OF THE INVENTION

This invention relates generally to computer-implemented methods and apparatus for modeling energy systems.

Profitable operation of an energy system is of particular interest in industry. Optimization of operation requires predictive models depicting thermo-economic performance of the energy system, and a method to solve those models in order to determine the most profitable way to operate the system. The performance of many of these energy systems is strongly influenced by various factors including environmental factors, operational factors or constraints (e.g. production limits and system output requirements).

Energy systems vary in configuration of both equipment setup and processes. One known plant optimization software configuration described in U.S. Pat. No. 6,591,225, issued Jul. 8, 2003, has set a standard for efficient optimization of classical configurations of power plants. However, the structure of this software does not permit it to be extended simply beyond the realm of a particular set of power plant equipment configurations. In particular, software limitations limit the usefulness of this software configuration for power plants of complex configuration, especially those connected to or serving process plants. Two examples of such process plants are chemical process plants and water desalination plants. Furthermore, at least one other known configuration of power plant optimization software uses an essentially non-linear formulation of the power generation process and generally bases its optimization on non-linear optimization algorithms.

The fact that the equations representing energetic performances of most energy systems are inherently non-linear complicates the process of optimization. At the same time, a common expectation of any optimization system is to select which equipment to operate and which to shutdown during times of low load demand. This would require that the optimization system include selection switches such as integer variables. Optimization algorithms dealing with both non-linear equations and integer variables normally require computational times exceeding practically acceptable or useful limits.

BRIEF DESCRIPTION OF THE INVENTION

In one aspect, some configurations of the present invention therefore provide a computer-implemented method for modeling and/or improving operational performance of an energy system. The method includes providing a graphical user interface configured to allow a user to manipulate equipment icons into an energy system model representation, using modular, function-based equipment models to simulate behavior of equipment represented by the manipulated equipment icons to solve an energy system model represented by the manipulation, and displaying a solution of the energy system model.

In another aspect, some configurations of the present invention provide a computer system having at least a display, a pointing device, one or more processors, and memory. The memory has stored therein a set of instructions configured to instruct the processor or processors to display a graphical user interface of icons, accept input from a pointing device to manipulate equipment icons into an energy system model representation, use modular, function-based equipment models to simulate behavior of equipment represented by the manipulated equipment icons to solve an energy system model represented by the manipulation, and display the solution of the energy system model.

In yet another aspect, some configurations of the present invention provide a machine readable medium readable for use with a computer system having at least a display, a pointing device, one or more processors, and memory. The medium has recorded thereon a set of instructions configured to instruct the processor or processors to display a graphical user interface of icons, accept input from the pointing device to manipulate equipment icons into an energy system model representation, use modular, function-based equipment models to simulate behavior of equipment represented by the manipulated equipment icons to solve an energy system model represented by the manipulation, and display results of the energy system model.

It will be appreciated that configurations of the present invention provide a modular software platform for modeling and optimization of energy systems. An advantage of some configurations is that models are developed such that mixed integer linear programming algorithms can be used for optimization rather than non-linear optimization algorithms. Moreover, many configurations of the present invention provide users with the ability to configure energy systems models of arbitrary complexity using a graphical user interface.

In addition, some configurations of the present invention allow energy system configurations to be represented and optimized, with the scope of use being limited essentially only by a users' domain knowledge of each element or process sub-system. In some configurations, equations and constraints governing the performance of the entire system can be solved so that an objective function is maximized or minimized to provide an optimal set of operating parameters of the system.

DETAILED DESCRIPTION OF THE INVENTION

Some configurations of the present invention provide computer-implemented methods and apparatus for modeling energy systems. Technical effects of some configurations of the present invention include the generation and solution of energy system models that predict performance of an energy system under varying physical, operational, and/or economic conditions.

Some configurations of the present invention facilitate the creation of equipment definition files with configurable properties and the development of rules to govern behavior of equipment to produce optimal settings for one or more specific equipment types. Also, technical effects of various configurations of the present invention include, but are not limited to, facilitating the definition of new equipment types, properties, and rules that govern equipment behavior.

An optimization system in some configurations of the present invention combines an energy system model that predicts performance of the energy system under varying ambient and operational conditions with an economic model that includes economic constraints of the energy system. The optimization system predicts the operational control set points (i.e., variables) of the energy system to achieve the most profitable operating modes (or at least, operating modes having favorable or increased profitability) for a particular combination of ambient, operational, contractual and/or economic conditions. Furthermore, some configurations provide a graphical user interface (GUI) that is configured to allow a user to graphically combine modules, each of which represents a piece of major equipment, a part thereof, or a gas or liquid transport pipeline network element.

In some configurations of the present invention, some equipment models utilize a modular, function-based model to simulate the thermo-economic behavior of an associated process or piece of equipment. For equipment models with a strong non-linear behavior, modular, function-based, piecewise linear models are used to closely simulate the non-linear behavior of the model while permitting use of efficient mixed integer linear program (MILP) algorithms. In addition, simulations are modularized in that pieces of equipment, sections thereof, or elements of a pipeline are represented by individual modules with specific equations or constraints. Thus, modeling equations can be solved efficiently, increased model configuration complexity is possible, and various types of hybrid power/process plants or various other energy systems (for example, pipelines) can be modeled using a GUI.

Figure 1:
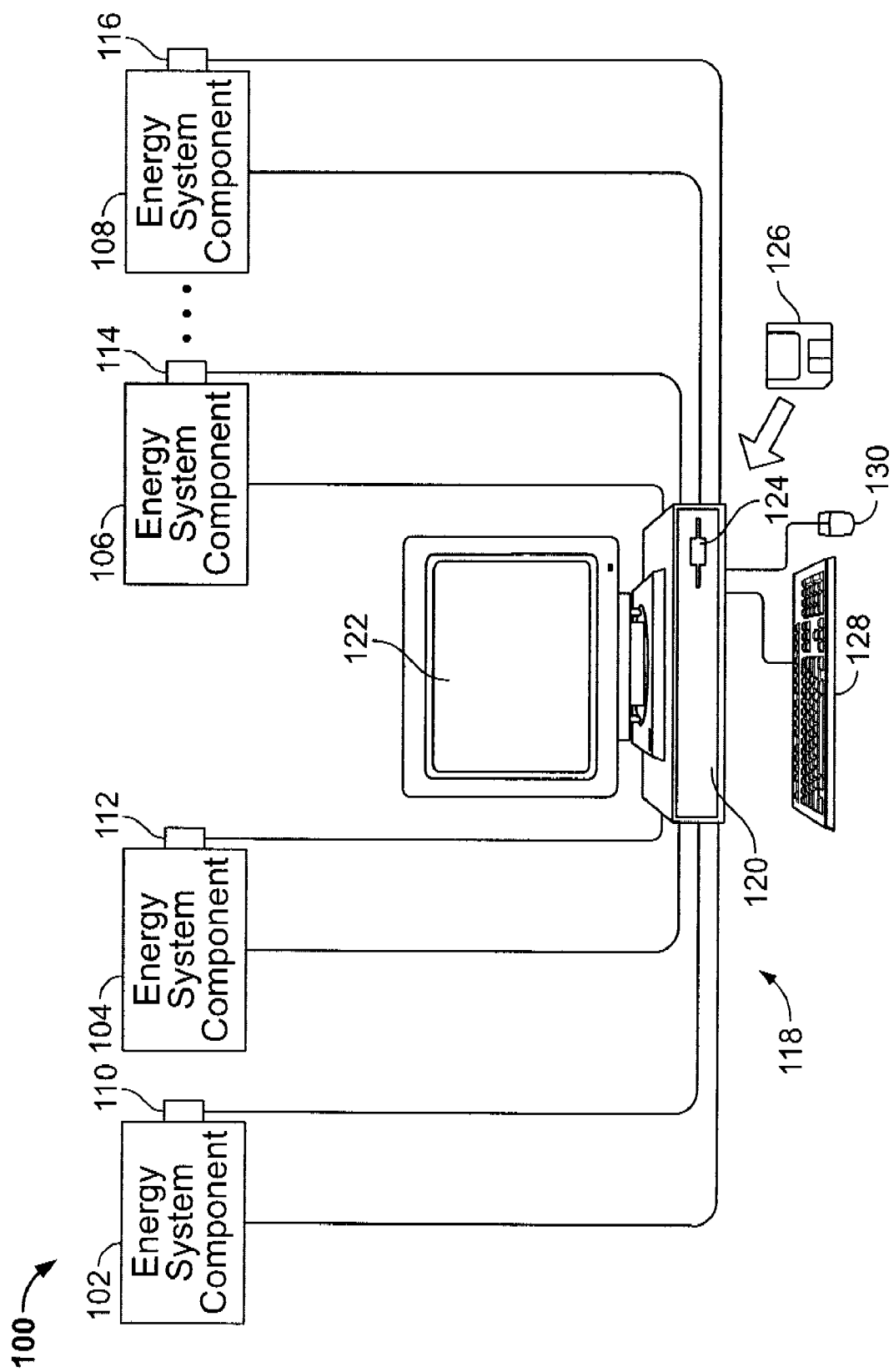
FIG. 1 is a block schematic diagram representative of a computer system used in some configuration of the present invention.

Referring to FIG. 1, some configurations of the present invention comprise a computer system 118 having a display 122, a processor 120, a user input device such as a keyboard 128, a pointing device 130 such as a computer mouse (other pointing devices are acceptable as a design choice), and memory (not all of which is shown in FIG. 1, but which may include primary memory such as RAM and ROM, and/or storage devices such as flash memory, EEPROM, floppy disks 126 and floppy disk drive 124, CD-ROM, CD-R, CD-RW, magnetic tape, DVD-ROM, DVD-R, DVD-RW, DVD+R, DVD+RW, hard drives, and various types of magnetic, optical, and electronic or electrostatic storage devices and drives without limitation). Some configurations of the present invention are located at an energy system 100 (for example, a power plant) and include one or more sensors 110, 112, 114, 116 that are configured to sense conditions of a corresponding set of one or more operating physical energy system components such as energy system equipment 102, 104, 106, 108. Computer system 118 is configured to receive these signals in these configurations and to use them in a manner described in detail below. Also, some configurations of the present invention are configured to transmit signals to one or more of physical energy system components 102, 104, 106, 108 (not necessarily the same as those being sensed by sensors 110, 112, 114, 116 in all configurations) to control energy system 100. However, not all configurations of the present invention require that computer system 118 be configured to control energy system 100 and/or to sense conditions of one or more physical energy system components 102, 104, 106, 108. Also, in configurations of the present invention that do control energy system 100 and/or input sensed parameters of physical energy system components, such input and/or control can be provided by receiving and/or transmitting signals from or to one or more separate software or hardware system that more directly interact with physical components of the plant and/or sensors.

Figure 2:
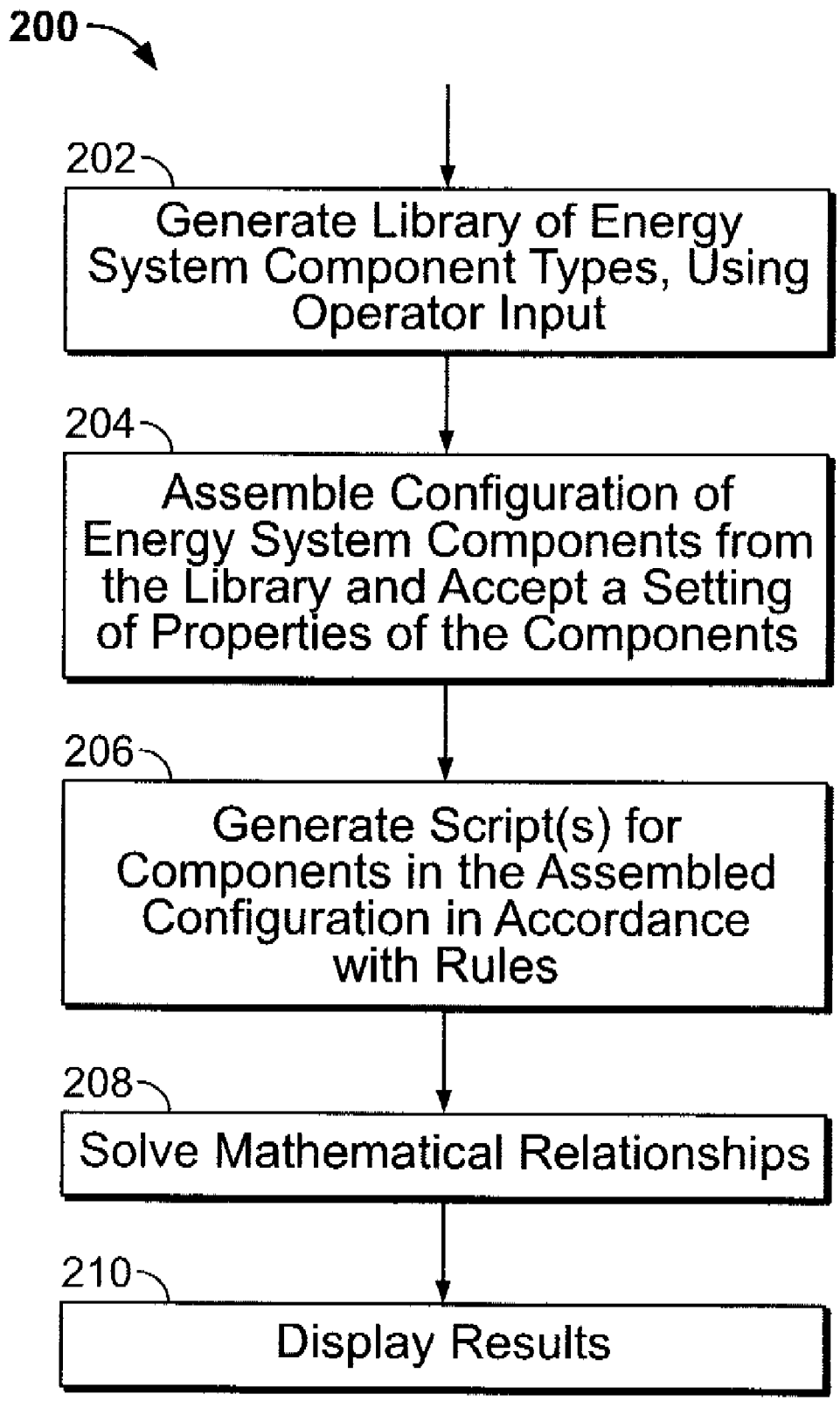
FIG. 2 is a flow chart representative of some methods used in configurations of the present invention.

Within the memory (in some configurations, on a machine-readable medium such as a floppy disk 126, and/or any of the various types of CDs, DVD, and/or flash memory, ROM cartridge, etc.) and referring to FIG. 1, flow chart 200 of FIG. 2, instructions are written or otherwise included that are configured to instruct processor 120 to generate 202 a library ("equipment definition file") of energy system component types using user input. In some configurations, user input at 202 and the generated library includes properties of the component types as well as rules to generate scripts in accordance with property values. These property values can be entered later. In some configurations of the present invention, the library of component types can include non-physical components, such as economical or legal components. Examples of economic components are fuel purchases and sales, and examples of legal components are emission limits and credits. These non-physical components can be modeled with mathematical rules, just as components representing physical equipment can be modeled with mathematical rules.

In some configurations of the present invention, the instructions are further configured to assemble 204 a configuration of energy system components from the library. For example and referring to graphical user interface (GUI) screenshot 500 of FIG. 3, a configuration 502 of energy system components 504 is laid out to create a model of a power plant. An Icon Palette 506 provides a library of energy system component ("equipment") types that a user can select to model equipment in an actual or hypothetical power plant. Each component icon 504 has several properties 508 that can be used by a user to enter specific values matching operating conditions of an actual or hypothetical power plant being modeled.

Figure 3:
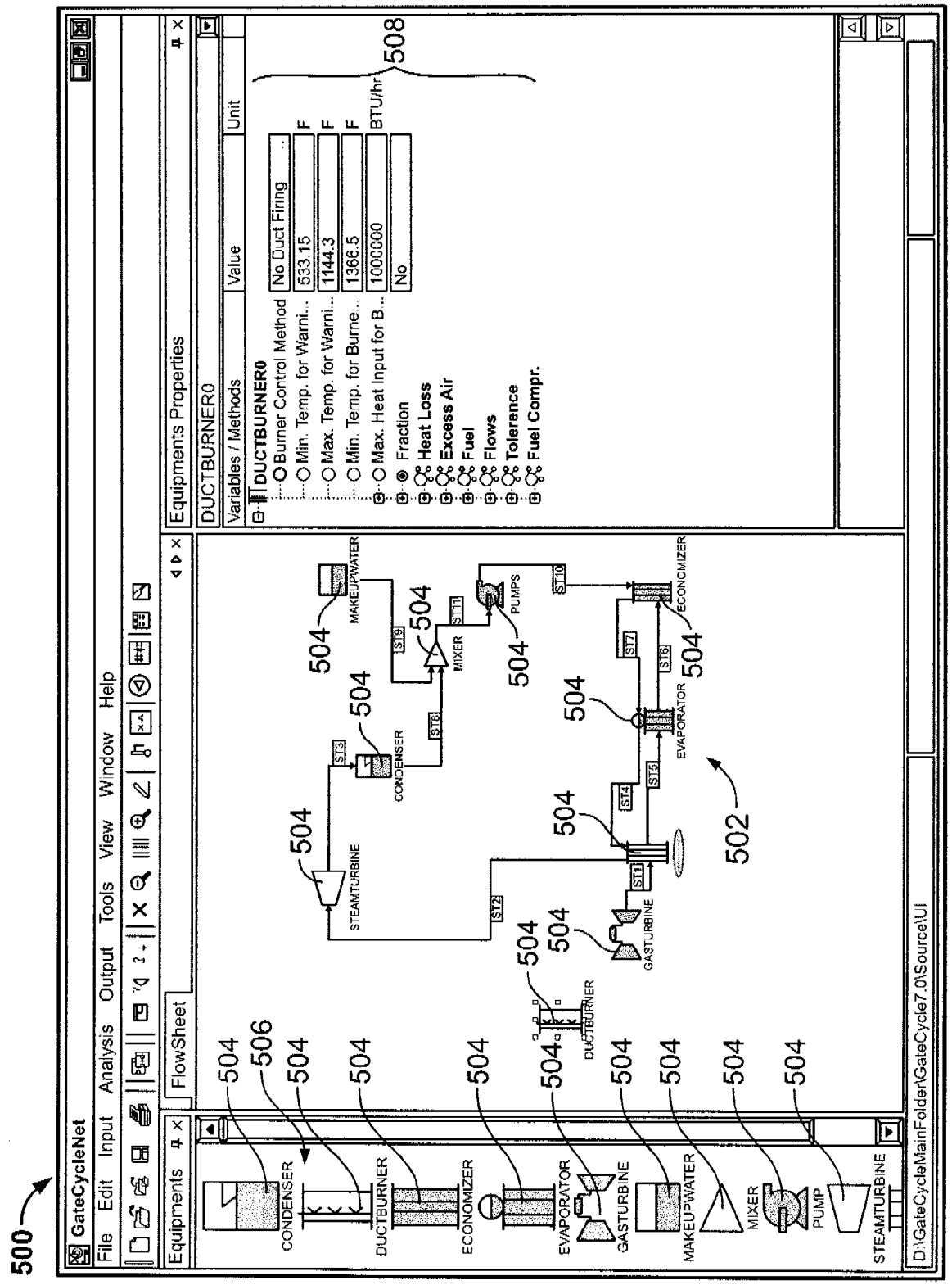
FIG. 3 is a screen shot of a configuration assembly screen such as that provided in some configurations of the present invention.

Referring to FIG. 3, assembly of a configuration is accomplished by a user who inputs a layout and connection of components into a GUI configured to accept such input. The GUI also accepts from the user a set of property values 508 for the components. In some configurations, to assemble a configuration of energy system components from the library using user input, the instructions are further configured to instruct the processor to display a plant diagram 502, display energy system component types 504 in a palette 506, and move and instantiate user-selected energy system component types 504 into plant diagram 502 in response to user input, such as by clicking and dragging mouse 130. ("Move" here is also intended to encompass configurations that copy and then move the selected energy system component types.) In some configurations and referring again to FIG. 1, the instructions are further configured to instruct processor 120 to receive signals from sensors such as 110, 112, 114, and/or 116 that sense conditions of physical components 102, 104, 106, 108, respectively, in an energy system 100. The physical components correspond to the energy system component icons in the assembled configuration 502 being simulated. In some configurations, the instructions are also configured to use the received signals from these sensors to set property values 508 of the energy system components in assembled configuration 502 that correspond to the physical components 102, 104, 106 and/or 108 that are being sensed. In some configurations, economical and/or legal components are also used as input and provided as component types 504 along with energy system component types. For example, information about fuel purchases or sales by a power plant and/or emission limits or credits can be entered via keyboard 128, pointing device 130, removable media 126, or via a public or private network communicating with processor 120. Also in some configurations, processor 120 does not interconnect with physical sensors such as 110, 112, 114, and/or 116, but rather information regarding the operation of physical components such as 102, 104, 106, and 108 is entered into processor 120 via the same methods described for economical and/or legal components. Thus, it is not necessary to interconnect processor 120 with any energy system components at all in some configurations, and at least some configurations of the present invention either do not provide the ability to do so or make such interconnections optional.

Figure 4:
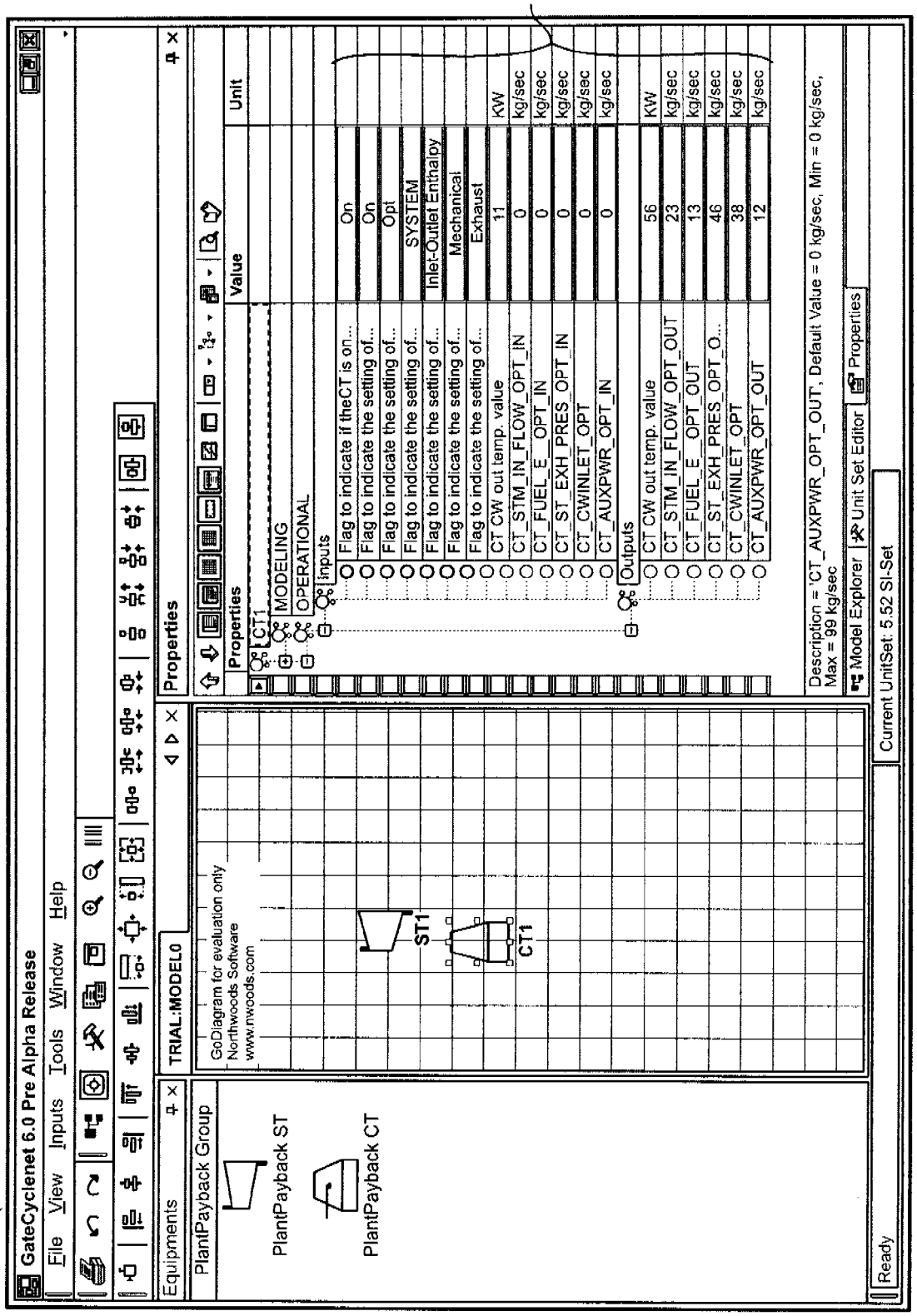
FIG. 4 is a screen shot of a result display such as that provided in some configurations of the present invention.

Also referring to FIG. 2 as well, the instructions are also configured to generate 206 a script or scripts (such as a Lingo script) from the components 504 selected for configuration 502 in accordance with the rules. The script or scripts includes mathematical relationships within and/or among the selected energy system components. The instructions are further configured to provide a solving engine such as a Lingo script interpreter and/or rule processor (either alone or in combination) that instructs processor 120 to solve 208 the mathematical relationships and to display 210 the results of the solution on the display or on a printer and/or use the results to control energy system 100. A typical result display is shown in screenshot 600 of FIG. 4, which can be displayed, for example, using a GUI module. Results 602 in this configuration are shown in a tabular format. The results can be optimized in accordance with selected criteria.

Figure 5:
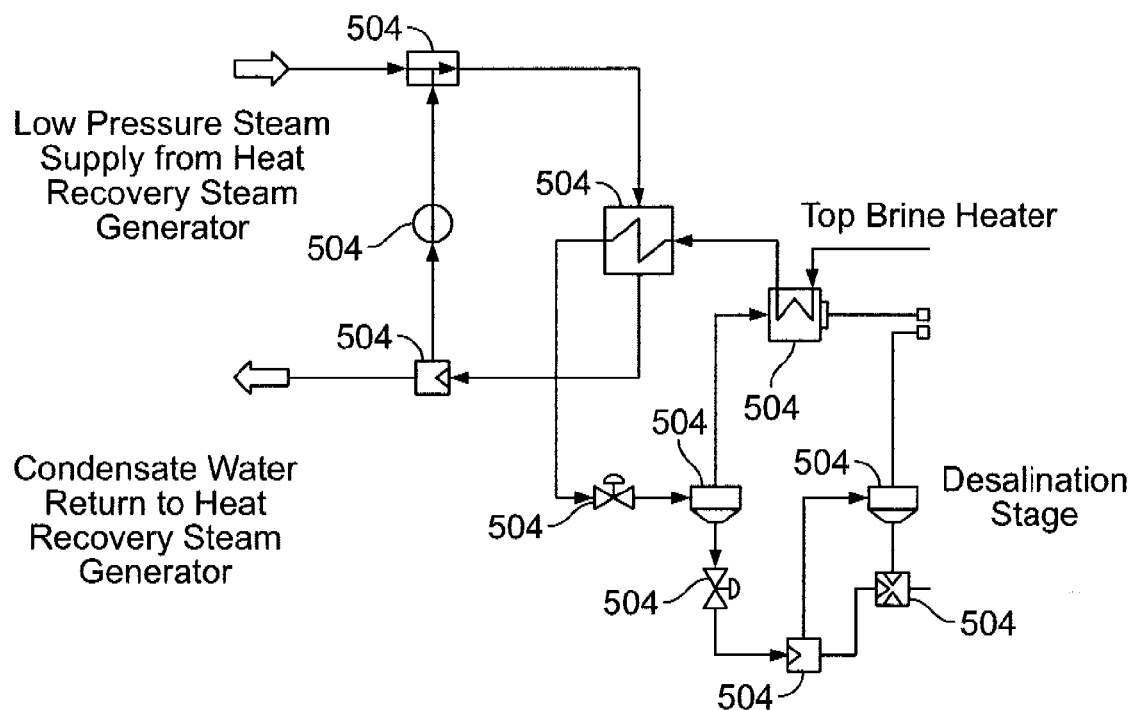
FIG. 5 is a assembled configuration of components useful for simulating a desalinization plant in some configurations of the present invention.

Although some configurations of the present invention are particularly suitable for simulation of power generating plants, the present invention is not limited solely to such simulations and can be used for various energy systems. For example, an assembled configuration of components 504 for simulating a desalination plant is shown in FIG. 5.

A configuration of energy system components is assembled 204 by computer 118 from the library. User input is used by computer 118 to assemble this configuration into an editor. The editor is configured to accept a layout and connection of the configuration of energy system components and to accept a configuration of properties and setting of the properties of the energy system components. Next, a script or scripts are generated 206 for energy system components in the component configuration. The generated scripts include mathematical relationships within and/or among the energy system components, including economic and/or legal components, if used in the energy system component configuration. Computer 118 solves 208 the mathematical relationships and displays 210 results of the solution. In configurations in which signals are or can be transmitted from the computer, they may be used to control an energy system in accordance with the results of the solution. Otherwise, results are displayed or printed on a printer (not shown) and used for setting physical equipment parameters and/or determining and/or using determined non-physical parameters, such as fuel purchases and/or sales, or use of emission credits.

In some configurations and referring also to FIG. 3 assembling 202 a configuration of energy system components from the library using user input further comprises displaying a plant diagram 502, displaying the energy system component types 504 in a palette 506, and moving and instantiating user-selected component types 504 into diagram 502 in response to user input.

Further, in some configurations and referring also to FIG. 1, setting the properties of energy system components 504 in assembled configuration 502 further comprises receiving signals from sensors 110, 112, 114, 116 sensing conditions of physical components 102, 104, 106, 108 in an energy system 100 that correspond to energy system components 504 in the assembled configuration, and using the received signals to set the properties of the corresponding energy system components in the assembled configuration.

In some configurations of the present invention, a system for modeling the operational performance of an energy system is provided. The modeling system combines energetic models of plant or system equipment or elements under varying operational and environmental constraints with, in some configurations, a set of economic models that predict the operating economics of the energy system. Model equations are generated by the modeling system, and values of parameters constraints for each equipment or element are specified by users.

Users graphically connect each module by manipulating icons on a graphical user interface (GUI) to build a representation of an energy system configuration. The modeling system generates an overall set of equations and constraints by assembling equations and constraints of all equipment or elements as specified by user. The modeling system then uses a solver to provide the solution, and displays the results of the solution on the user interface.

The modeling system can be used to predict the most profitable (or at least, more profitable) set points for controllable variables of the energy system being modeled. In some configurations, the modeling system receives from a user environmental, operational, contractual, and other constraints, so that a solution proposed by the modeling system remains within those limits or constraints.

The energy system being modeled may include, among other things, gas turbines, heat recovery steam generators, individual steam generation boilers burning any of a plurality of fuels, compressors or pumps in a compressor or pump station configuration, gas or liquid pipeline elements with pressure reducing valves or other related equipment, processing plant equipment such as reactors. Examples of diagrams representing modeled energy systems appear in FIGS. 6, 7 and 8.

In some configurations of the present invention, the modeling system uses a linearized formulation for essentially non-linear processes. This linearization is effected around a known operating point. Operation or shutdown of an equipment in the system is represented by an integer switch that is specified or constrained by users, left to be determined by the modeling system, or both. In this embodiment, any process equation is considered to have an output or "effect" variable that is a function of one or several input or "cause" variables. An equation (the "principal" equation) for each process module is written in the following general format in some configurations:

$$\text{MODULE\_}Y = \text{MODULE\_}Y\_\text{OPER} * \text{MODULE\_ON} \\ + \text{MODULE\_}X1\_\text{CONST} * (\text{MODULE\_}X1 - \text{MODULE\_}X1\_\text{OPER} * \text{MODULE\_ON}) + \text{MODULE\_}X2\_\text{CONST} * (\text{MODULE\_}X2 - \text{MODULE\_}X2\_\text{OPER} * \text{MODULE\_ON}) + \text{MODULE\_}X3\_\text{CONST} * (\text{MODULE\_}X3 - \text{MODULE\_}X3\_\text{OPER} * \text{MODULE\_ON})$$

The above equation represents a case in which 3 independent variables affect the output or product of the equipment. However, an equipment module may have a greater or lesser number of input variables that affect its process product.

To ensure that output of a module vanishes as the equipment or module is shutdown, the following constraints are used in some configurations. These constraints also serve to limit the calculated value of variables within user-specified limits.

MODULE_Y<=MODULE_Y_MAX*MODULE_ON

MODULE_Y>=MODULE_Y_MIN*MODULE_ON

A description of the variables and parameters in the above equations and constraints follows:

| Variable | Description |
| --- | --- |
| MODULE_Y | Calculated value of the product of the equipment represented by the module |
| MODULE_Y_OPER | User-specified value of the product of the equipment represented by the module at certain operating point |
| MODULE_ON | Integer variable or the switch indicating whether equipment is operating or non-operating. This switch may be specified by users, or left to be calculated by the optimization system |
| MODULE_X1 | One of the several independent variables of the equipment, affecting the product variable MODULE_Y |
| MODULE_X1_OPER | Value of variable MODULE_X1 at the user-specified operating point |
| MODULE_X1_CONST | Slope of the variation of variable MODULE_Y as a function of variation of MODULE_X1 at the user-specified operating conditions |
| MODULE_Y_MAX | Upper bound of the product of equipment, MODULE_Y specified by users |
| MODULE_Y_MIN | Lower bound of the product of equipment, MODULE_Y specified by users |

In the above table, only those variables with suffix _X1 are described. The description of variables with suffixes _X2, _X3, etc. are similar to those of variables with suffix _X1.

Parameter MODULE_X1_CONST indicates variation of the product variable as a function of variations in variable MODULE_X1 only. In mathematical terms, it is the first order partial derivative of the output or product variable with respect to the input variable X1. If the behavioral function of the equipment is essentially linear with respect to this independent variable, it can be considered as constant, and equal to the value provided by the user. Linear behavior is normally the case for the variations in steam generation in a heat recovery steam generator, as a function of inlet gas temperature or inlet gas flow rate. In the case of some equipment, such as steam turbines in power generation applications of the present invention, governing equations are not linear, and parameters such as MODULE_X1_CONST are considered constant only in a vicinity of an operating point MODULE_X1_OPER.

Similar equations and constraints are written for each equipment module. These and other equations associated with economic modules are then assembled. The entire set of linearized equations and constraints is then solved using a solver module that, in some configurations, uses a Mixed Integer Linear Programming (MILP) algorithm. A detailed description of linearization as well as modeling equations for selected equipment such as steam turbines and gas turbines can be found in previously issued U.S. Pat. No. 6,591,225 B1. A solution algorithm can be selected that results in relatively fast calculation speeds. In order to accommodate the non-linearity associated with some of the modeled equipment, users can optionally select an iteration scheme to enhance the accuracy of the solution. If the iteration scheme is selected, the values of selected partial derivatives represented by the parameters with suffix_CONST are updated and the optimization is executed again.

Figure 6:
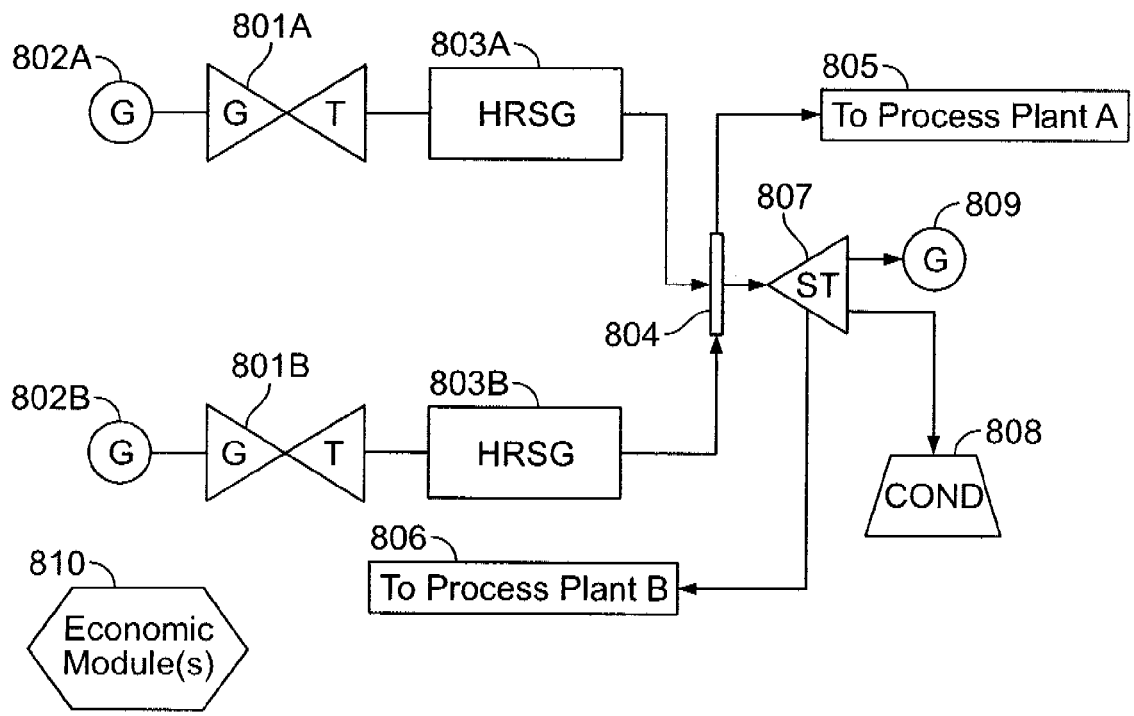
FIG. 6 is a schematic diagram of a cogeneration system modeling example.

An example of an application of a modeling system configuration of the present invention is a cogeneration system represented by the diagram of FIG. 6. In FIG. 6, gas turbines 801A and 801B consume fuel 802A and 802B to generate electricity via their respective generators 803A and 803B. The energy of exhaust gases from each gas turbine 801A, 801B is used in heat recovery steam generators (HRSG) 803A and 803B connected to each gas turbine 801A, 801B. Steam generated in HRSGs 803A and 803B is collected in headers such as header 804. From header 804, steam may be directed to a process plant 805 and/or 806, such as a refinery, a chemical plant, or a water desalination plant, thus making this application of the modeling system useful for mixed power/process plant modeling and optimization. Headers such as header 804 also direct their steam to a steam turbine 807 that would generate electricity via its generator 808. The vapor coming out of steam turbine 807 is cooled in condenser 809 from which water is pumped back to the HRSGs 803A, 803B. One or more economic modules such as 810 include calculation of incomes, costs, and constraints associated to the overall plant.

Figure 7:
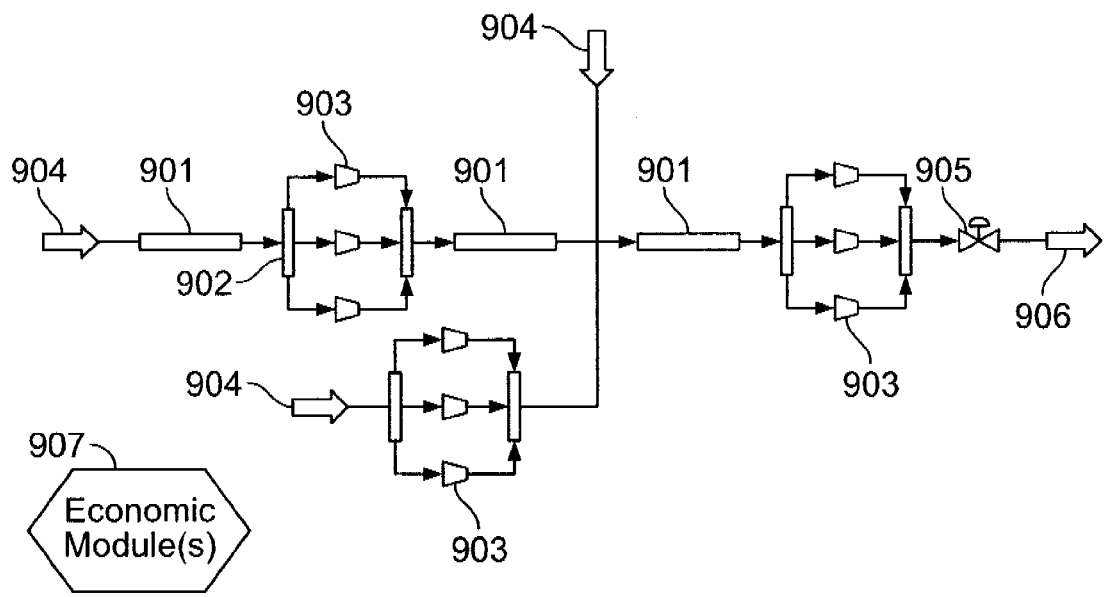
FIG. 7 is a schematic diagram of a gas pipeline system modeling example.
Figure 8:
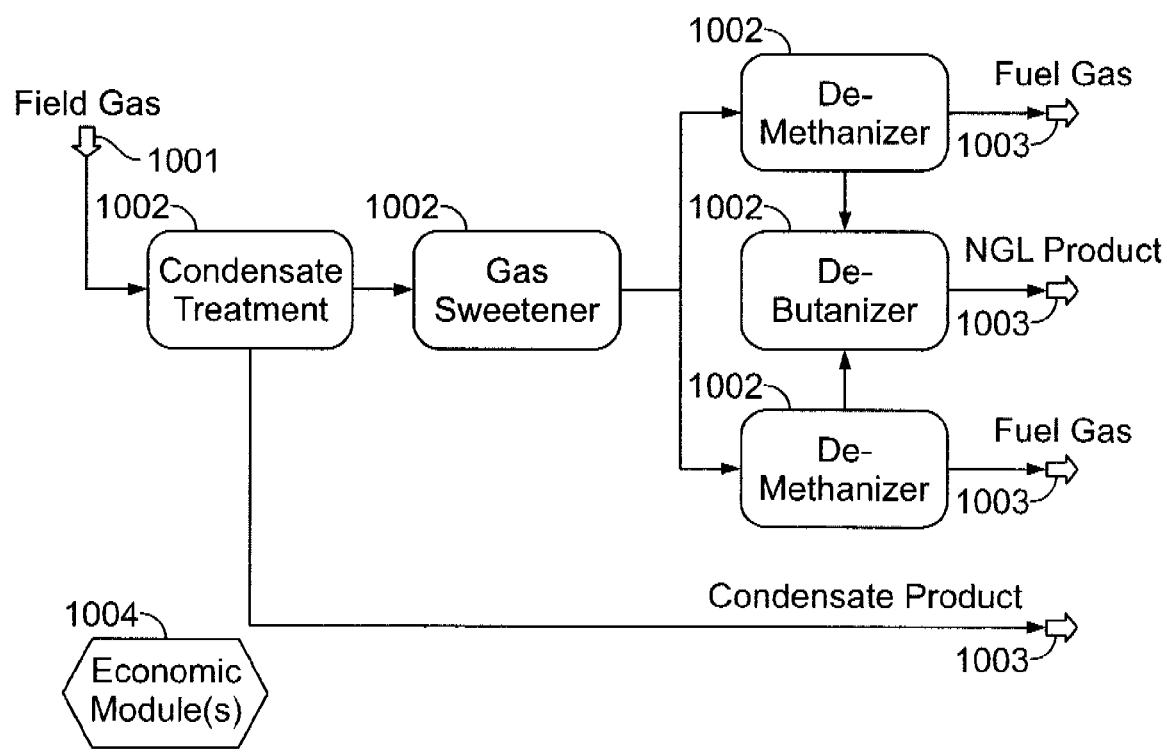
FIG. 8 is a schematic diagram of a gas processing plant modeling example.

In another configuration, a modeling system uses non-linear formulations and an appropriate solution technique for parts of the energy system being modeled, and mixed integer/linear formulation for other parts. Such configurations are of particular use in gas pipeline modeling and optimization, schematically displayed in FIG. 7. In FIG. 7, gas enters the energy system at entry points 904, flows in long pipes 901, and is re-energized at compressor stations each comprising several compressors 903 in parallel or in series. Compressors 903 receive gas from upstream headers 902 and deliver gas to downstream headers 902, from which the gas continues its journey through pipes and other compressor stations and other equipment such as pressure reducing stations 905, before being delivered at a delivery point 906. Economic modules such as 907 are configured to add non-process equations and constraints such as price calculation, income and cost evaluation and/or other limitations.

In yet another configuration, a modeling system uses non-linear formulations and an appropriate solution technique without integer mixing. Such configurations are particularly useful for gas processing plant modeling and optimization, where relationships between products and inlets are determined separately, but are not linearized. For example and referring to the diagram of FIG. 8, gas from a well enters a plant at an entry point 1001. This gas is processed by several processing units or modules 1002, and end products are delivered at exit points or modules 1003. Input/output relationships for each module are developed and saved in the modeling system. Economic modules such as 1004 are configured to add non-process equations and constraints such as price calculation, income and cost evaluation and/or other limitations. The modeling system uses non-linear optimization to solve the set of all equations and constraints.

It will be thus appreciated that configurations of the present invention provide a modular software platform for modeling and optimization of energy systems. An advantage of some configurations is that models are developed such that mixed linear programming algorithms can be used for optimization rather than non-linear optimization algorithms. Moreover, many configurations of the present invention provide users with the ability to configure energy systems models of arbitrary complexity using a graphical user interface. Such models can include, for example, combined-cycle power plants, cogeneration power plants district heating model power plants, gas pipeline or liquid pipeline systems, chemical process plants, or more generally, power plants or process plants.

In addition, some configurations of the present invention allow energy system configurations to be represented and optimized, with the scope of use being limited essentially only by a users' domain knowledge of each element or process sub-system. In some configurations, equations and constraints governing the performance of the entire system can be solved so that an objective function is maximized or minimized to provide an optimal set of operating parameters of the system.

While the invention has been described in terms of various specific embodiments, those skilled in the art will recognize that the invention can be practiced with modification within the spirit and scope of the claims.

What is claimed is:

1. A computer-implemented method for modeling and/or improving operational performance of a power plant, said method comprising:
providing a graphical user interface configured to allow a user to manipulate equipment icons into an energy system model representation;
using modular, function-based equipment models to simulate behavior of a plurality of physical components represented by the manipulated equipment icons, wherein the equipment models are piece-wise linear functions that simulate non-linear behavior of the plurality of physical components;
generating at least one script that defines a mathematical relationship between the plurality of physical components as a function of at least one rule governing behavior of the plurality of physical components;
using the at least one script to generate an optimized solution to the energy system model using the equipment models, wherein said generating an optimized solution comprises performing a mixed integer linear programming optimization on the equipment models to determine a first set of said plurality of physical components to operate and a second set of said plurality of physical components to not operate, wherein the first and second sets represent an optimized mode of operation of the power plant; and
displaying the solution of the energy system model.

2. A method in accordance with claim 1 wherein the piece-wise linear equipment models each represent an item of energy system equipment, a section thereof, or a pipeline element, and wherein the graphical user interface further includes icons representing economic modules, and said simulation further includes using the economic modules to solve the energy system model.

3. A method in accordance with claim 2 wherein each piece-wise linear equipment model includes at least one member of the group consisting of equations and constraints.

4. A method in accordance with claim 1 wherein the power plant is a combined-cycle power plant, a cogeneration power plant or a district heating model power plant.

5. A method in accordance with claim 1 wherein the energy system model is a model of a gas pipeline or liquid pipeline system.

6. A method in accordance with claim 1 wherein the energy system model is a model of a chemical process plant.

7. A method in accordance with claim 1 wherein the energy system model is a model of a power plant or a process plant.

8. A method in accordance with claim 1 further comprising:
receiving a signal from at least one sensor coupled to at least one physical component for receiving data from the at least one physical component, wherein the signal contains information about at least one condition of the at least one physical component; and
using the information received from the at least one sensor to generate the solution to optimize the power plant.

9. A computer system having at least a display, a pointing device, one or more processors, and memory, said memory having stored therein a set of instructions configured to instruct the processor or processors to:
display a graphical user interface of icons;
accept input from a pointing device to manipulate equipment icons into an energy system model representation;
use modular, function-based equipment models to simulate behavior of a plurality of physical components represented by the manipulated equipment icons to solve the energy system model representation, wherein the equipment models are piece-wise linear functions that simulate non-linear behavior of the plurality of physical components;
generate at least one script that defines a mathematical relationship between the plurality of physical components as a function of at least one rule governing behavior of the plurality of physical components;
generate an optimized solution to the energy system model using the at least one script and the equipment models, wherein said generating an optimized solution comprises performing a mixed integer linear programming optimization on the equipment models to determine a first set of said plurality of physical components to operate and a second set of said plurality of physical components to not operate, wherein the first and second sets represent an optimized mode of operation of the power plant; and
display the solution of the energy system model.

10. A system in accordance with claim 9 wherein the piece-wise linear equipment models each represent an item of energy system equipment, a section thereof, or an element of a pipeline.

11. A system in accordance with claim 10 wherein each of the piece-wise linear equipment models include at least one member of the group consisting of equations and constraints.

12. A system in accordance with claim 9 wherein the graphical user interface further includes icons representing economic modules, the economic modules comprise at least one of a fuel purchase, a fuel sale, and an emission credit use, and said simulation includes using the economic modules to solve the energy system model.

13. A machine readable medium readable for use with a computer system having at least a display, a pointing device, one or more processors, and memory, said medium having recorded thereon a set of instructions configured to instruct the processor or processors to:
display a graphical user interface of icons;
accept input from the pointing device to manipulate equipment icons into an energy system model representation;
use modular, function-based equipment models to simulate behavior of a plurality of physical components represented by the manipulated equipment icons to solve the energy system model representation, wherein the equipment models are piece-wise linear functions that simulate non-linear behavior of the plurality of physical components;

generate at least one script that defines a mathematical relationship between the plurality of physical components as a function of at least one rule governing behavior of the plurality of physical components;

generate an optimized solution to the energy system model using the at least one script and the equipment models, wherein said generating an optimized solution comprises performing a mixed integer linear programming optimization on the equipment models to determine a first set of said plurality of physical components to operate and a second set of said plurality of physical components to not operate, wherein the first and second sets represent an optimized mode of operation of the power plant; and display the results of the energy system model.

14. A medium in accordance with claim 13 wherein the piece-wise linear equipment models each represent an item of energy system equipment, a section thereof, or an element of a pipeline.

15. A medium in accordance with claim 14 wherein each piece-wise linear equipment model includes at least one member of the group consisting of equations and constraints, the graphical user interface further includes icons representing economic modules, said simulation further includes using the economic modules to solve the energy system model, and instructions are further configured to instruct said processor or processors to utilize non-linear formulations for a part of an energy system model and mixed linear/integer formulations for other parts.

* * * * *